No. 834,482. PATENTED OCT. 30, 1906.
R. H. MOUSER, Jr.
SEEDER.
APPLICATION FILED JAN. 17, 1906.
3 SHEETS—SHEET 2.
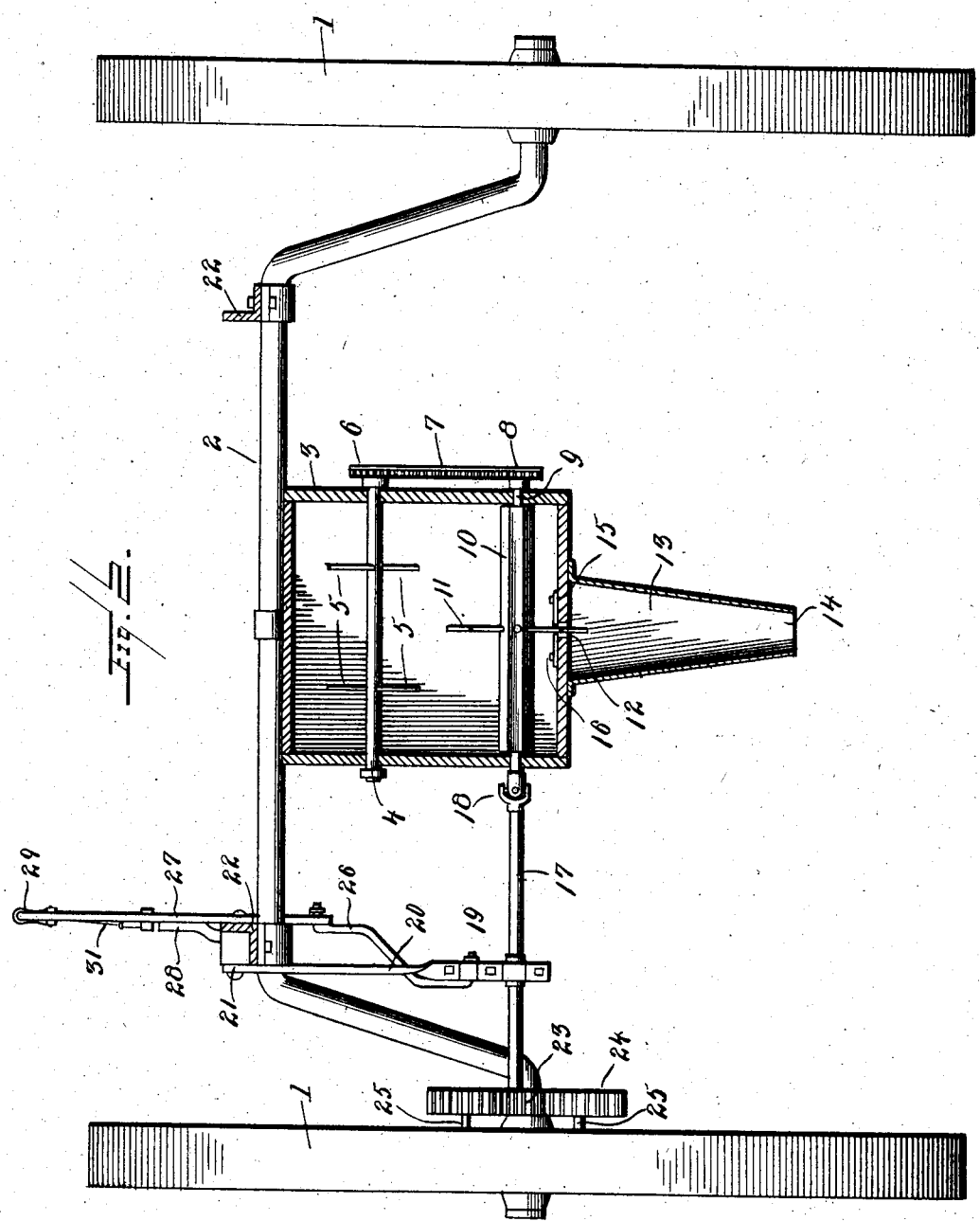
WITNESSES:
INVENTOR
R. H. Mouser Jr.
BY Watson E. Coleman
Attorney

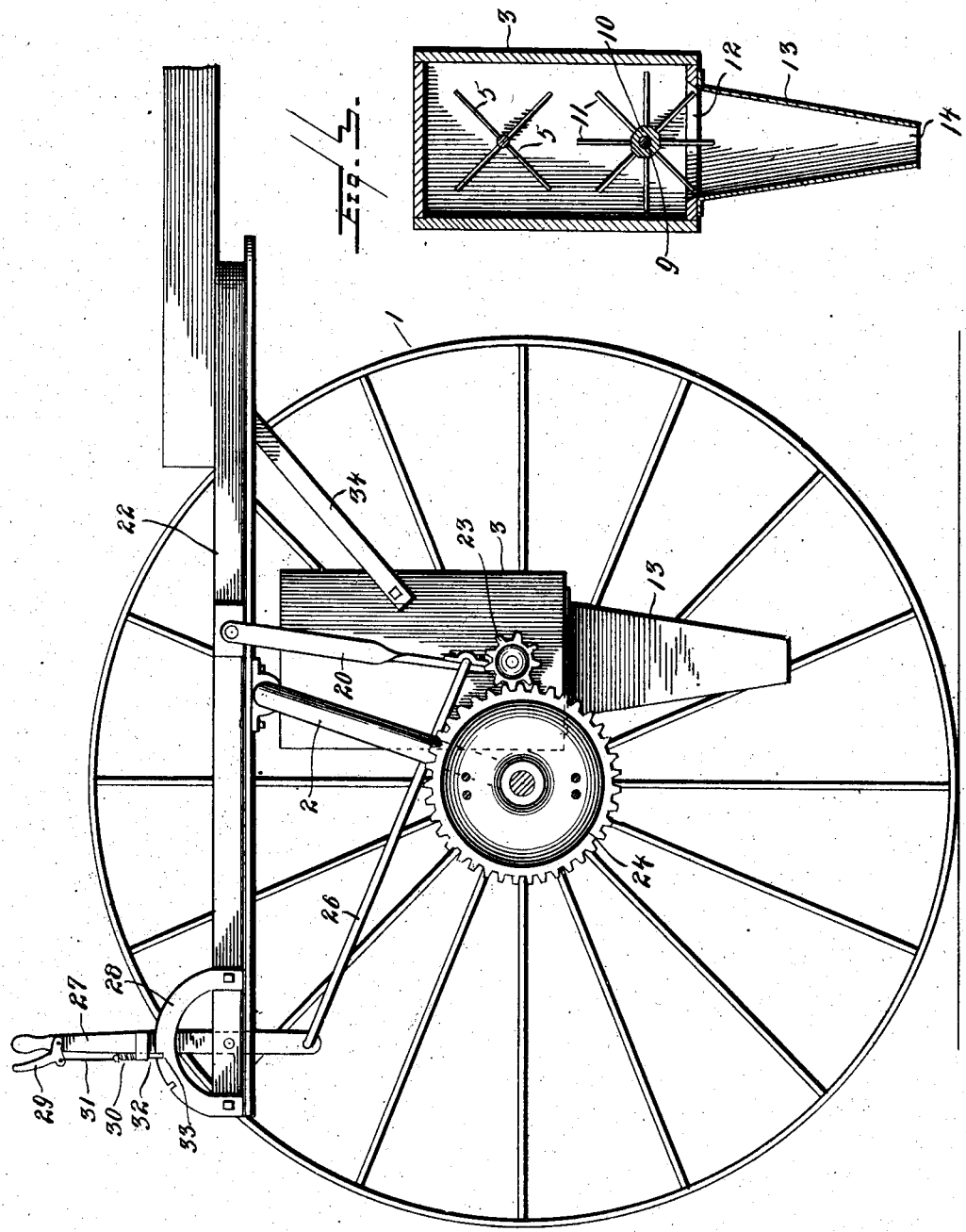

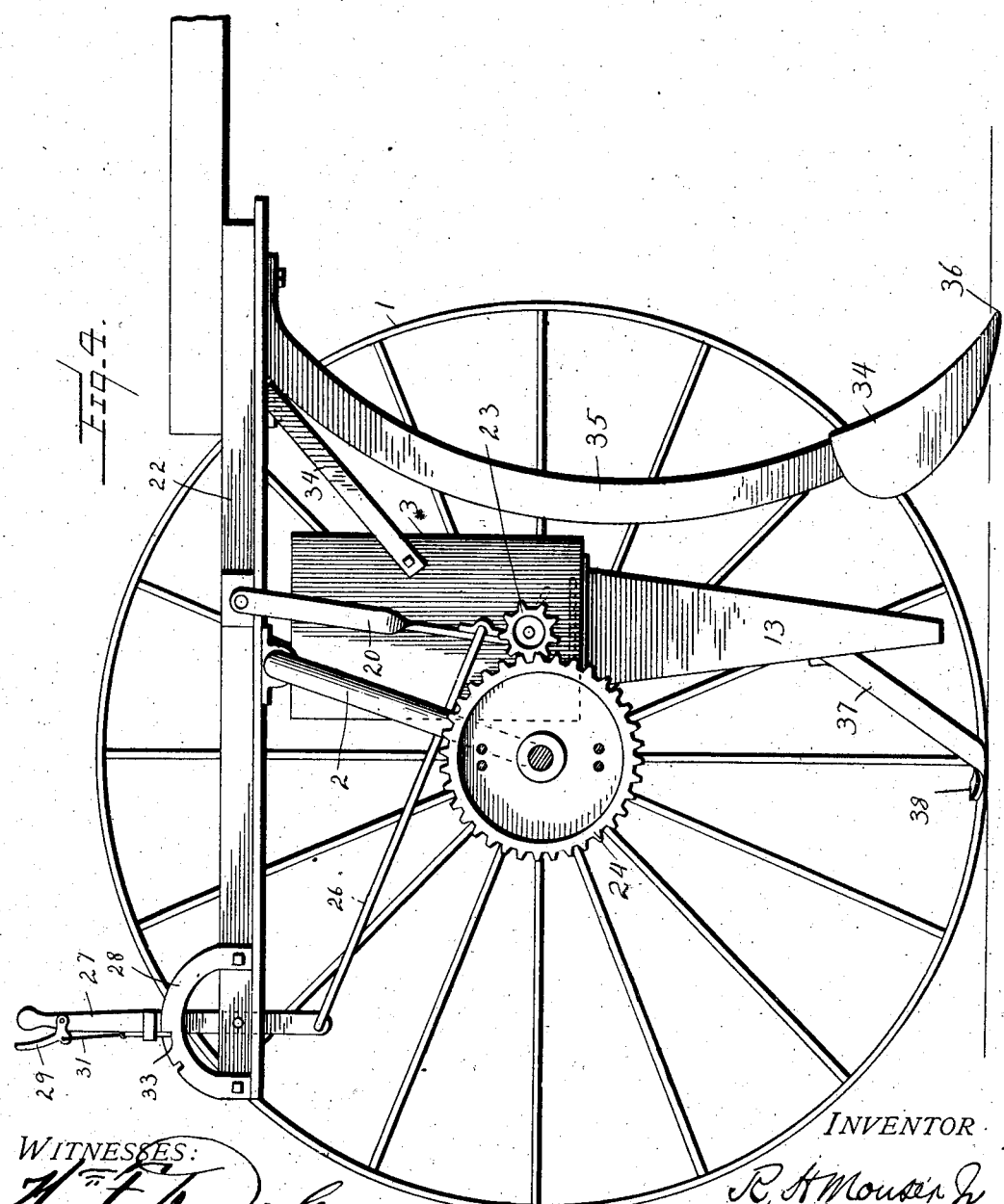

UNITED STATES PATENT OFFICE.

ROBERT H. MOUSER, JR., OF CROWN, TEXAS.

SEEDER.

No. 834,482.   Specification of Letters Patent.   Patented Oct. 30, 1906.

Application filed January 17, 1906. Serial No. 296,482.

*To all whom it may concern:*

Be it known that I, ROBERT H. MOUSER, Jr., a citizen of the United States, residing at Crown, in the county of Atascosa and State of Texas, have invented certain new and useful Improvements in Seeders, of which the following is a specification, reference being had therein to the accompanying drawings.

My invention relates to seeders, and more particularly to a device of the character described that may be readily attached to cultivators of well-known construction or which may be used separately, as shall be found convenient or desirable, one of the advantages being to provide a seeder which shall be simple and comparatively inexpensive in construction, durable, and easy and effective in operation.

Other objects and advantages of my invention, as well as the structural features by means of which these objects are attained, will be made clear by an examination of the specification, taken in connection with the accompanying drawings, in which the same reference-numerals indicate corresponding portions throughout, and in which—

Figure 1 is a side elevation. Fig. 2 is a cross-section through the seedbox and chute and illustrating the manner of stirring the seed and feeding the same to the chute. Fig. 3 is a transverse section taken through the seedbox and the chute, and Fig. 4 is a view similar to Fig. 1, but showing a modified form of feeding means and also showing means for making a furrow and covering the same.

1 designates the wheels, and 2 the axle, which, in connection with parts hereinafter described, serves as the framework of the machine.

3 designates the seedbox or receptacle carried by the axle 2 and in which is placed the seed through a suitable opening in the top. In this box is suitably journaled a rod or shaft 4, having fixed thereon agitators or arms 5, which serve to stir the seed in the box as the shaft rotates, and thereby keep it fed down. This shaft 4 has on its outer end a sprocket-wheel 6, connected by a sprocket-chain 7 to another sprocket-wheel 8, fixed on a shaft 9, suitably journaled in the seedbox and carrying a roller 10, on which is fixed the agitators or arms 11, which as the roller 10 rotates project through an elongated slot 12 in the bottom of the seedbox. The purpose of the arms or agitators 11 is to feed the seed through the slot 12 in regular and uniform manner where it empties into a cone-shaped chute or pipe 13 and passes out through an opening 14 in the bottom thereof. As a means of regulating or gaging the feeding of the seed to the slot 12 I provide on each side thereof a slide 15, which is adjusted in any suitable manner, preferably by a set-screw 16, passing through an elongated slot cut in the slide.

When it is desired that only a small amount of seed shall be fed through the slot 12, the slides 15 are pushed up closely to the agitators 11; but when a larger supply of seed is to be fed the slides are pulled away, as will be readily seen from an inspection of Fig. 2. The shaft 9 is connected with a shaft 17 by a universal joint or coupling 18. The shaft 17 is journaled in bearings 19, carried by an arm 20, pivotally mounted at 21 on the frame 22, which in connection with the axle 2 forms the supporting-frame of my improved seeder. The shaft 17 is rotated by means of a spur-gear 23, meshing with a master-gear 24, rotatable on the axle 2 by means of being connected with one of the wheels 1 by studs or arms 25, which pass into openings arranged opposite each other in the master-gear 23 and the wheel 1.

As a means of disconnecting the spur-gear 23 from the master-gear 24 I provide an arm 26, pivotally mounted on the arm 20 and likewise on a lever 27, pivoted on the frame 22. This lever is arranged opposite a semicircular arcuate notched or ratchet bar 28 and is also provided with the ordinary thumb-latch, comprising a handle 29, a spring 30, and a wire connection 31 between the handle and a stud 32, which said stud is adapted to engage the notches 33 in the ratchet-bar 28. By pressing on the handle 29, which is, in effect, a bell-crank lever, the stud 32 is pulled out of one of the notches 33, enabling the operator to move the lever 27. By pulling said lever back the spur-gear 23 is thrown out of engagement with the master-gear 24, and by dropping the stud 32 into one of the notches 33 said spur-gear is held out of engagement with said master-gear, and by replacing the lever, which position is shown in Fig. 1, the spur-gear is again brought into mesh with the master-gear.

As additional means of supporting the seedbox 3 on the framework of the machine I provide braces 34, one of which is shown in the drawings.

From the foregoing description it is thought that the operation and construction of my improved seeder will be apparent, and further explanation is not deemed necessary.

Having thus described my said invention, what I claim as new, and desire to secure by Letters Patent of the United States, is—

1. A seeder comprising a wheeled frame, a seedbox having an oblong slot in the bottom thereof, shafts rotatably journaled in the seedbox, agitators mounted on one of said shafts and adapted to stir the seed, agitators mounted on the other shaft and adapted to regulate the feeding of the seed through the slot, means for narrowing or widening the space between the side walls of said slot, a spout carried by said receptacle and adapted to convey the seed to the ground, a master-gear rotated by one of the wheels of the frame, a spur-gear meshing with the master-gear, a shaft rotated by the spur-gear, a universal coupling or joint connecting said shaft with one of the shafts journaled in the seed-receptacle, a sprocket-and-chain connection between said last-mentioned shafts whereby the rotation of one causes the rotation of the other, and means for throwing the spur-gear into and out of mesh with the master-gear.

2. A seeder comprising a wheeled frame, a seedbox having an oblong slot in the bottom thereof, shafts rotatably journaled in the seedbox, agitators mounted on one of said shafts and adapted to stir the seed, agitators mounted on the other shaft and adapted to regulate the feeding of the seed through the slot, means for narrowing or widening the space between the side walls of said slot, a spout carried by said receptacle and adapted to convey the seed to the ground, a master-gear rotated by one of the wheels of the frame, a spur-gear meshing with the master-gear, a shaft having the spur-gear fixed thereon, an arm pivoted on the frame, bearings carried by the arm and having the spur-gear shaft journaled therein, a lever carried by the frame, a rod connecting the arm and the lever whereby by operating the lever the spur-gear is thrown into and out of mesh with the master-gear, a universal coupling or joint connecting the spur-gear shaft with one of the shafts journaled in the seed-receptacle, and a sprocket-and-chain connection between the shafts in the feed-receptacle whereby the rotation of one causes the rotation of the other.

In testimony whereof I hereunto affix my signature in presence of two witnesses.

ROBERT H. MOUSER, Jr.

Witnesses:
CLAUD. FINCH,
M. L. MOUSER.